(12) United States Patent
Chi (10) Patent No.: US 6,691,800 B1
(45) Date of Patent: Feb. 17, 2004

(54) HAND-HELD PNEUMATIC TOOL WITH TWO OUTPUT AXLES

(76) Inventor: Ying Fang Chi, No. 50, Lane 311, Guangfu Rd., Taichung (TW)

( * ) Notice: Subject to any disclaimer, the term of this patent is extended or adjusted under 35 U.S.C. 154(b) by 0 days.

(21) Appl. No.: 10/441,166

(22) Filed: May 20, 2003

(51) Int. Cl.[7] .................................................. B23Q 5/10
(52) U.S. Cl. ......................... 173/216; 173/29; 173/217
(58) Field of Search ................................ 173/216, 217, 173/29, 45, 213; 81/57.13, 57.28, 57.31, 57.22

(56) References Cited

U.S. PATENT DOCUMENTS

| | | | | |
|---|---|---|---|---|
| 3,901,098 A | * | 8/1975 | Jinkins ........................ | 173/216 |
| 4,295,829 A | * | 10/1981 | Martinelli et al. ........... | 173/216 |
| 4,332,147 A | * | 6/1982 | Grech ......................... | 173/216 |
| 4,947,942 A | * | 8/1990 | Lightle et al. .............. | 81/57.28 |
| 5,533,581 A | * | 7/1996 | Barth et al. .................. | 173/217 |
| 5,690,183 A | * | 11/1997 | Sollami ....................... | 173/216 |
| 5,893,422 A | * | 4/1999 | Huang ........................ | 81/57.22 |

* cited by examiner

*Primary Examiner*—Scott A. Smith
(74) *Attorney, Agent, or Firm*—Rosenberg, Klein & Lee (57) ABSTRACT

A hand-held pneumatic tool includes a tubular body, an inlet device and a switch device respectively mounted in a first end of the tubular body. A pneumatic motor is mounted in a middle portion of the tubular body and has a shaft longitudinally extending from the pneumatic motor relative to the tubular body. A coupling is mounted on a free end of the shaft and has a first bevel gear formed on a distal periphery thereof. An output device is mounted in a second end of the tubular body and driven by the pneumatic motor. The output device includes a first output axle having a second bevel gear formed to engage to the first bevel gear of the coupling. A second output axle is longitudinally and securely mounted to the coupling so that the coupling directly drives the second output axle.

9 Claims, 8 Drawing Sheets

FIG. 8
PRIOR ART

HAND-HELD PNEUMATIC TOOL WITH TWO OUTPUT AXLES

BACKGROUND OF THE INVENTION

1. Field of the Invention

The present invention relates to a hand-held pneumatic tool, and more particularly to a hand-held pneumatic tool with two output axles.

2. Description of Related Art

Figure 5:
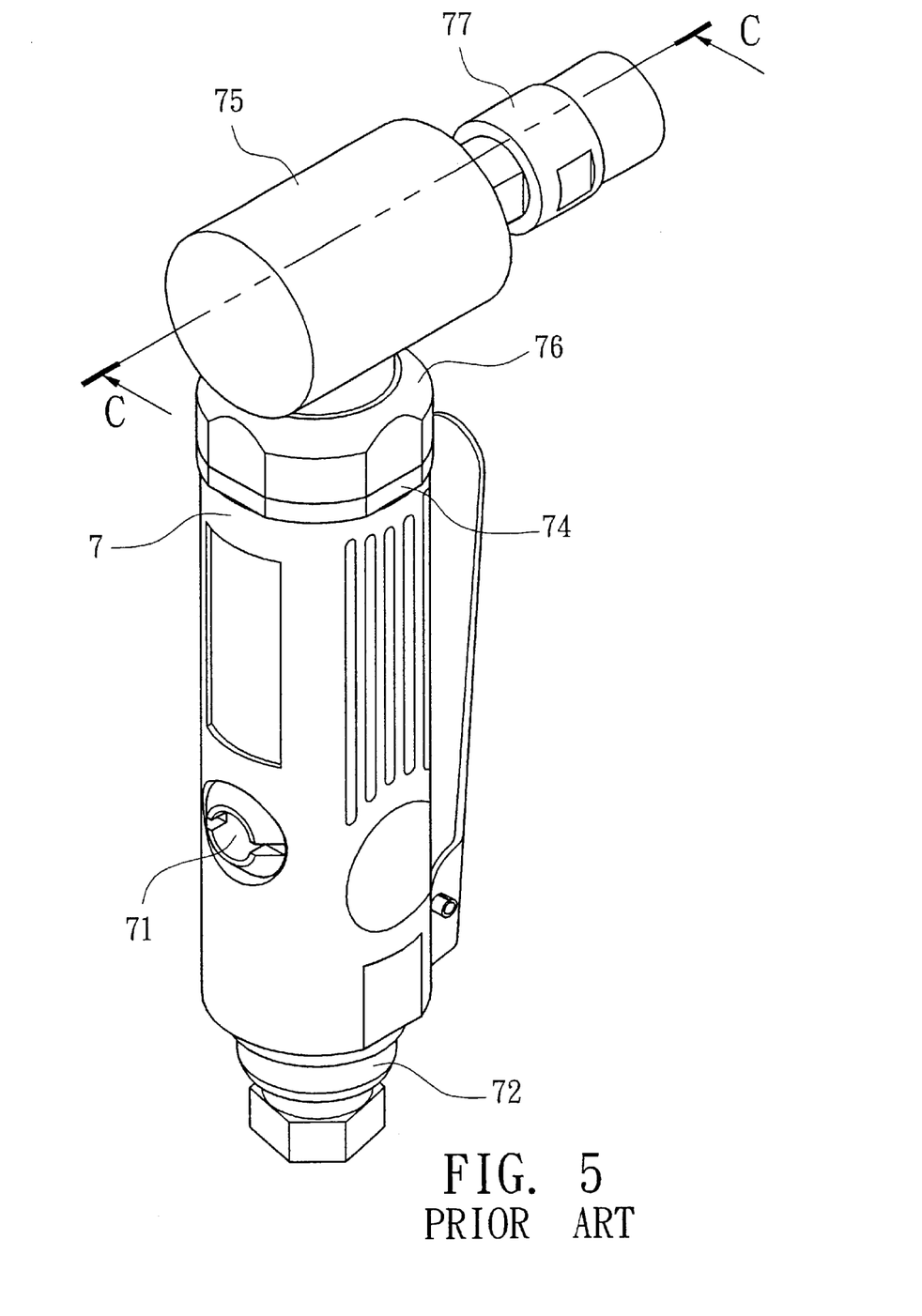
FIG. 5 is a perspective view of a conventional hand-held pneumatic tool in accordance with the prior art.
Figure 6:
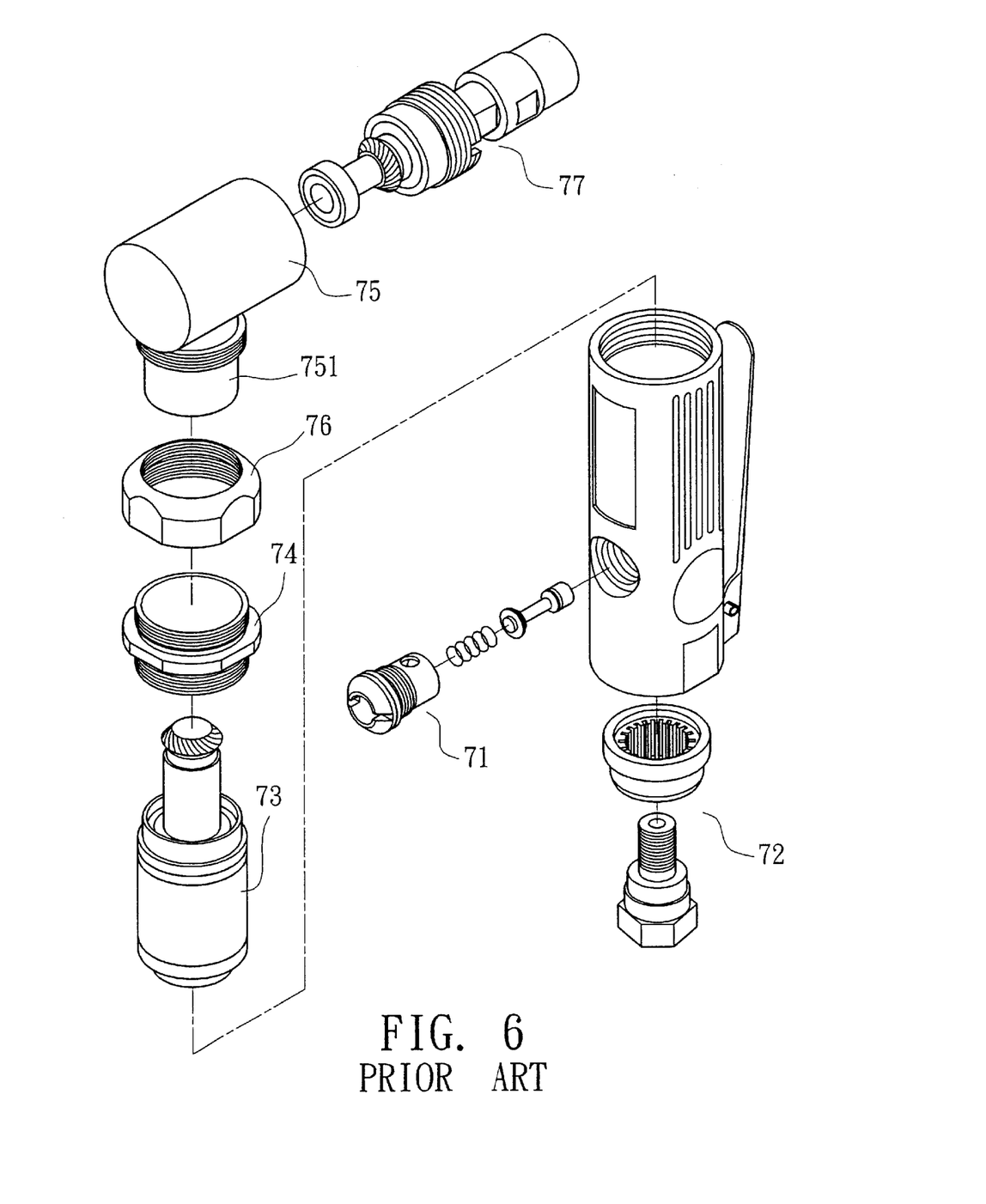
FIG. 6 is an exploded perspective view of the conventional hand-held pneumatic tool in FIG. 5.
Figure 7:
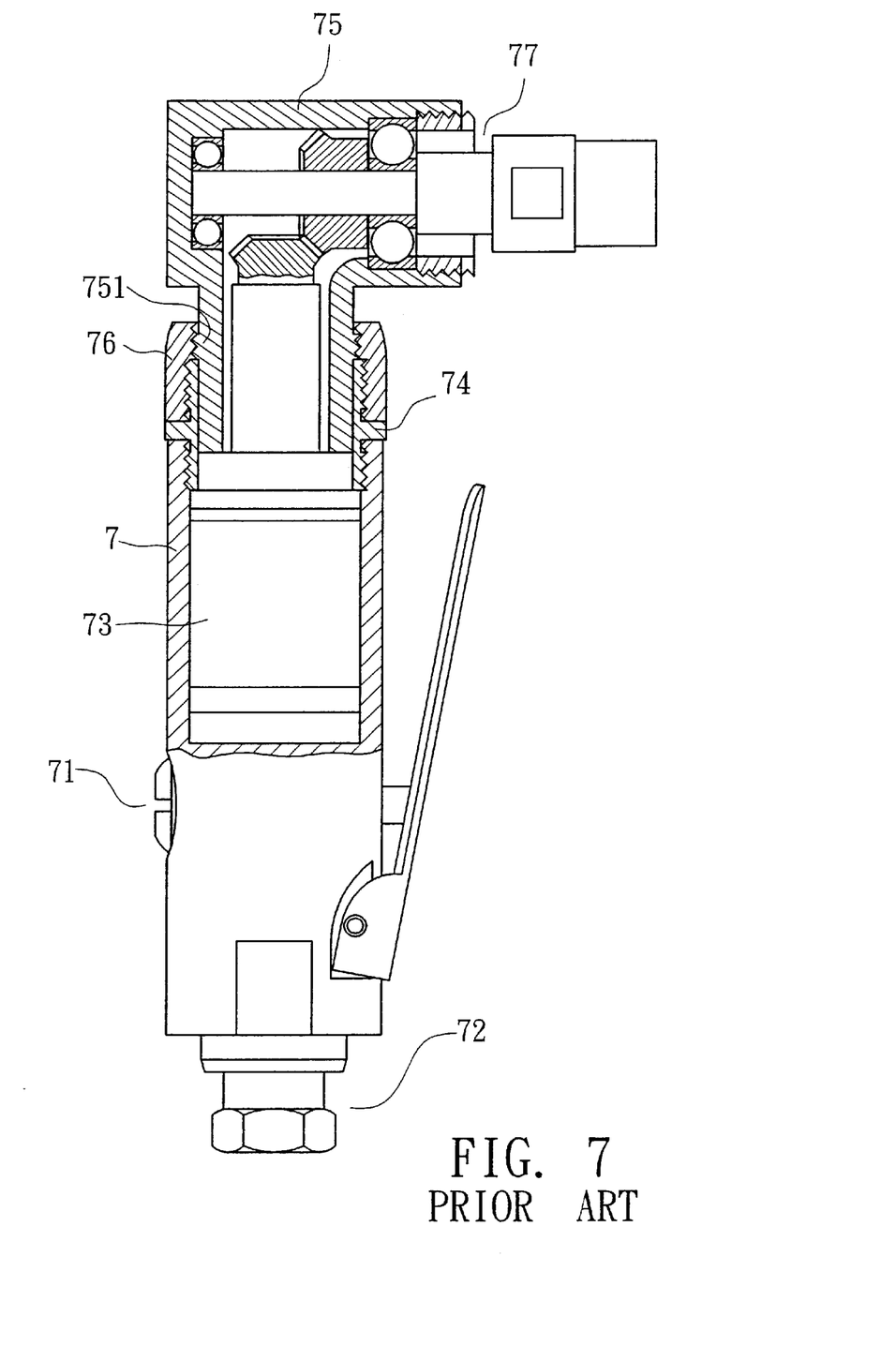
FIG. 7 is a partially cross-sectional view of the hand-held pneumatic tool in FIG. 5.

A conventional hand-held pneumatic tool in accordance with the prior art shown in FIG. 5 comprises a tubular body (7) having a lower portion and an upper portion. A switch device (71) is mounted in the lower portion of the tubular body (7) and a pneumatic motor (73) is mounted in the upper portion of the tubular body (7). An inlet device (72) is mounted in a first end of the tubular body (7) and a connector (74) is screwed onto a second end of the tubular body (7). An elbow (75) has a connecting section (751) extending therefrom and received in the connector (74). A collar (75) is mounted to the connector (74) after the connecting section (751) received in the connector (74) for holding the elbow (75) in place. An output device (77) in partially received in the elbow (75).

The output device (77) of the conventional hand-held pneumatic tool has an axis being perpendicular relative to that of the tubular body (7) and the user needs to hold the switch device (71) during operating. Consequently, the conventional hand-held pneumatic tool is usually used on a plane of the workpiece.

Figure 8:
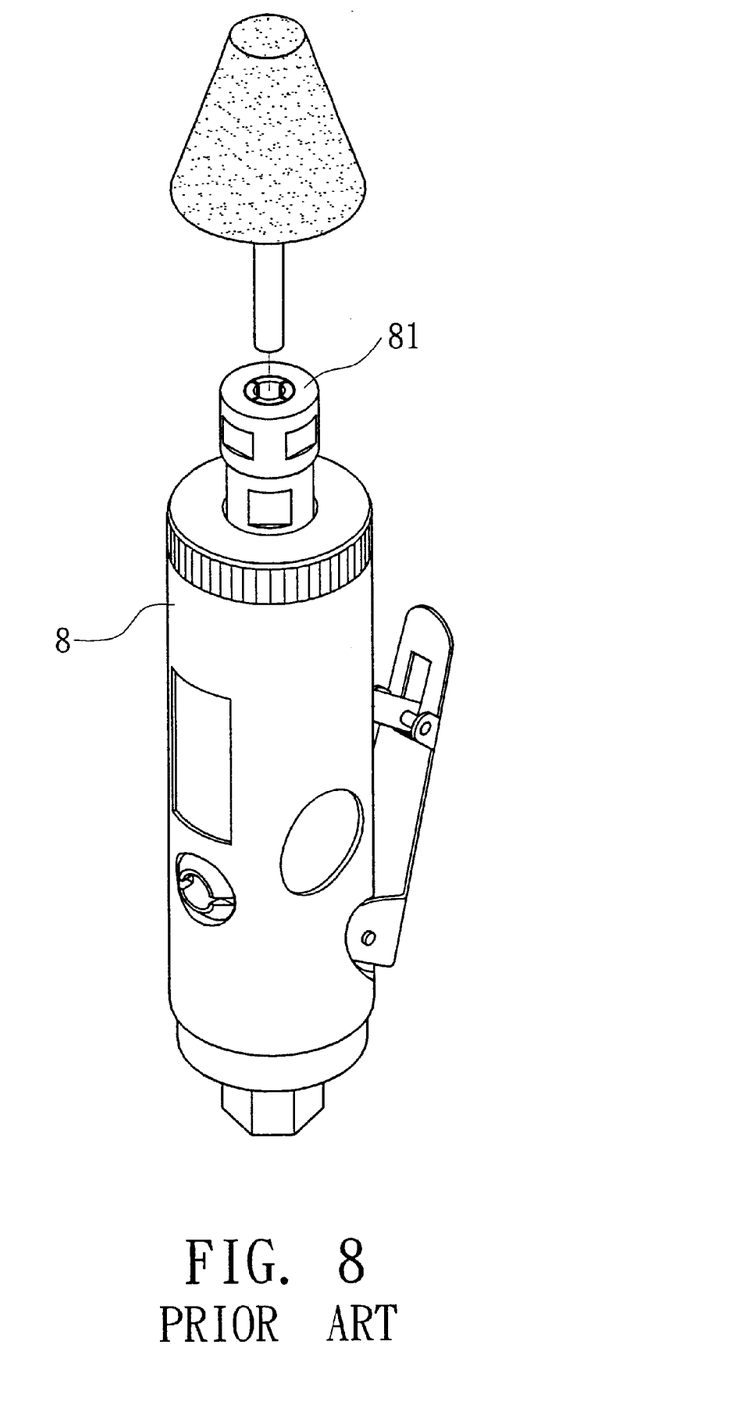
FIG. 8 is perspective view of another conventional hand-held pneumatic tool in which the output axle has an axis linearly corresponding to that of the tubular body.

Certainly, many conventional hand-held pneumatic tools each includes an output device (81) having an axis linearly corresponding to that of a tubular body (8) of each of the above hand-held pneumatic tool, as shown in FIG. 8. However, the hand-held pneumatic tool of this type is inconvenient for being used on a horizontal plane.

Furthermore, the output axle of the hand-held pneumatic tool is usually designed to be capable of connecting multiple tools for grinding, drilling or cutting. However, each tool respectively has an actuating direction of itself and the above conventional hand-held pneumatic tool has only one output axle. Consequently, the user must prepare multiple pneumatic tools for different work types so that the cost of preparing tools becomes very high and it is hard to orderly collected.

The present invention has arisen to mitigate and/or obviate the disadvantages of the conventional hand-held pneumatic tool.

SUMMARY OF THE INVENTION

The main objective of the present invention is to provide an improved hand-held pneumatic tool that includes two output axles.

To achieve the objective, the hand-held pneumatic tool in accordance with the present invention comprises a tubular body, an inlet device and a switch device respectively mounted in a first end of the tubular body. A pneumatic motor is mounted in a middle portion of the tubular body and has a shaft longitudinally extending from the pneumatic motor relative to the tubular body. A coupling is mounted on a free end of the shaft and has a first bevel gear formed on a distal periphery thereof. An output device is mounted in a second end of the tubular body and driven by the pneumatic motor. The output device includes a first output axle having a second bevel gear formed to engage to the first bevel gear of the coupling. A second output axle is longitudinally and securely mounted to the coupling so that the coupling directly drives the second output axle.

Further benefits and advantages of the present invention will become apparent after a careful reading of the detailed description with appropriate reference to the accompanying drawings.

BRIEF DESCRIPTION OF THE DRAWINGS

in FIG. 1;

DETAILED DESCRIPTION OF THE INVENTION

Figure 1:
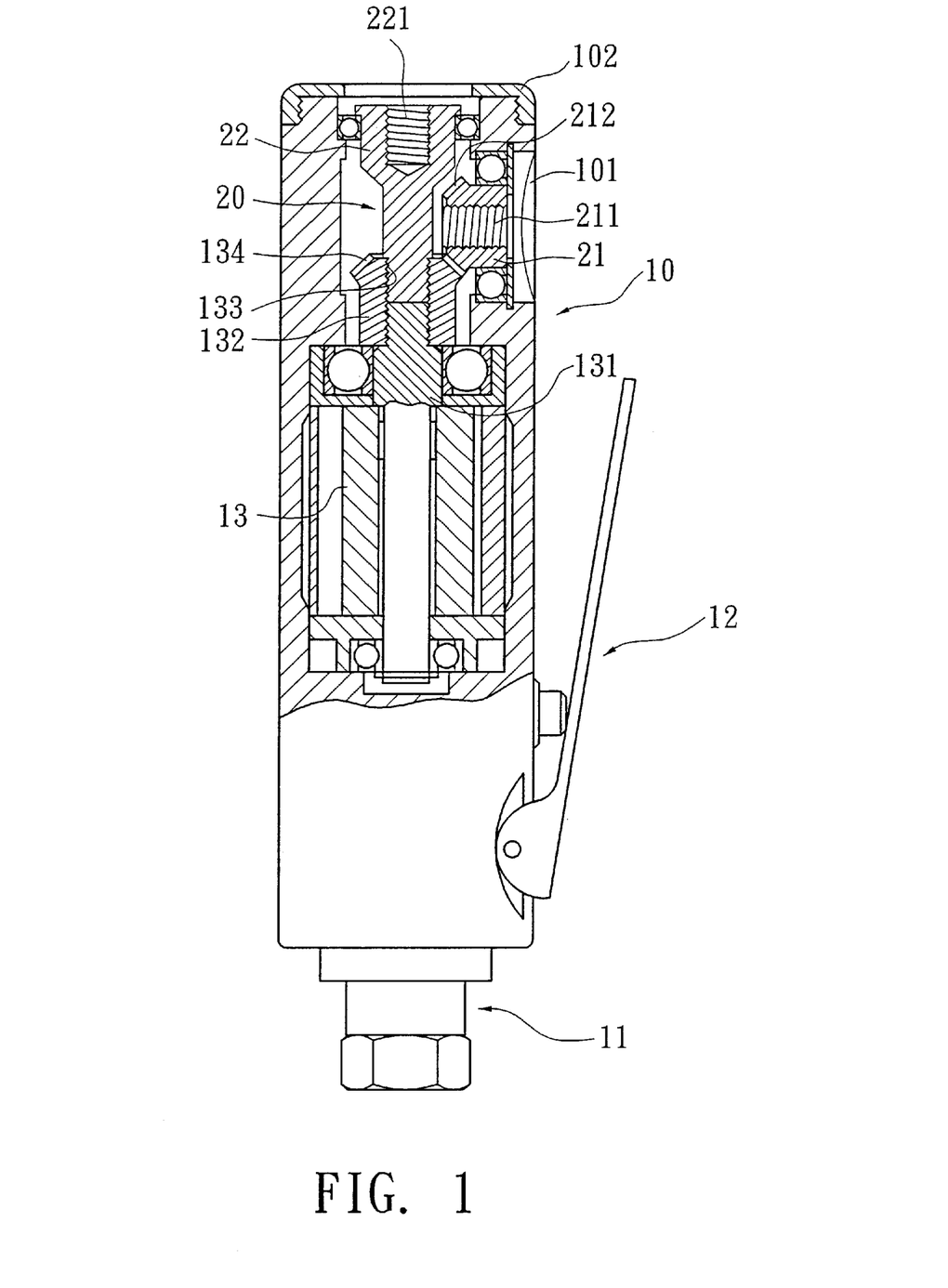
FIG. 1 is a cross-sectional plan view of the hand-held pneumatic tool in accordance with the present invention.

Referring to the drawings and initially to FIG. 1, a hand-held pneumatic tool with two output axles in accordance with the present invention comprises a tubular body (10) having a first end and a second end co-axially opposite to the first end of the tubular body (10). An inlet device (11) and a switch device (12) respectively mounted in the first end of the tubular body (10). The inlet device (11) is adapted to be connected to a high-pressure air source and the switch device (21) controls the inlet device (11) to allow the high-pressure air into the hand-held pneumatic tool of the present invention. A pneumatic motor (13) is mounted in a middle portion of the tubular body (10). The pneumatic motor (13) is operated when the high-pressure air passes through the inlet device (11). The pneumatic motor (13) includes a shaft (131) partially and rotatably received in the pneumatic motor (13) toward the second end of the tubular body (10), and a coupling (132) securely connected to a free end of the shaft (131). In the preferred embodiment of the present invention, the coupling (132) has a threaded hole (133) centrally defined therein and a threaded portion (not numbered) is formed on the free end of the shaft (131). Consequently, the coupling (132) is screwed onto the free end of the shaft (131). The pneumatic motor (13) drives an output device (20) that is mounted in the second end of the tubular body (10).

Figure 2:
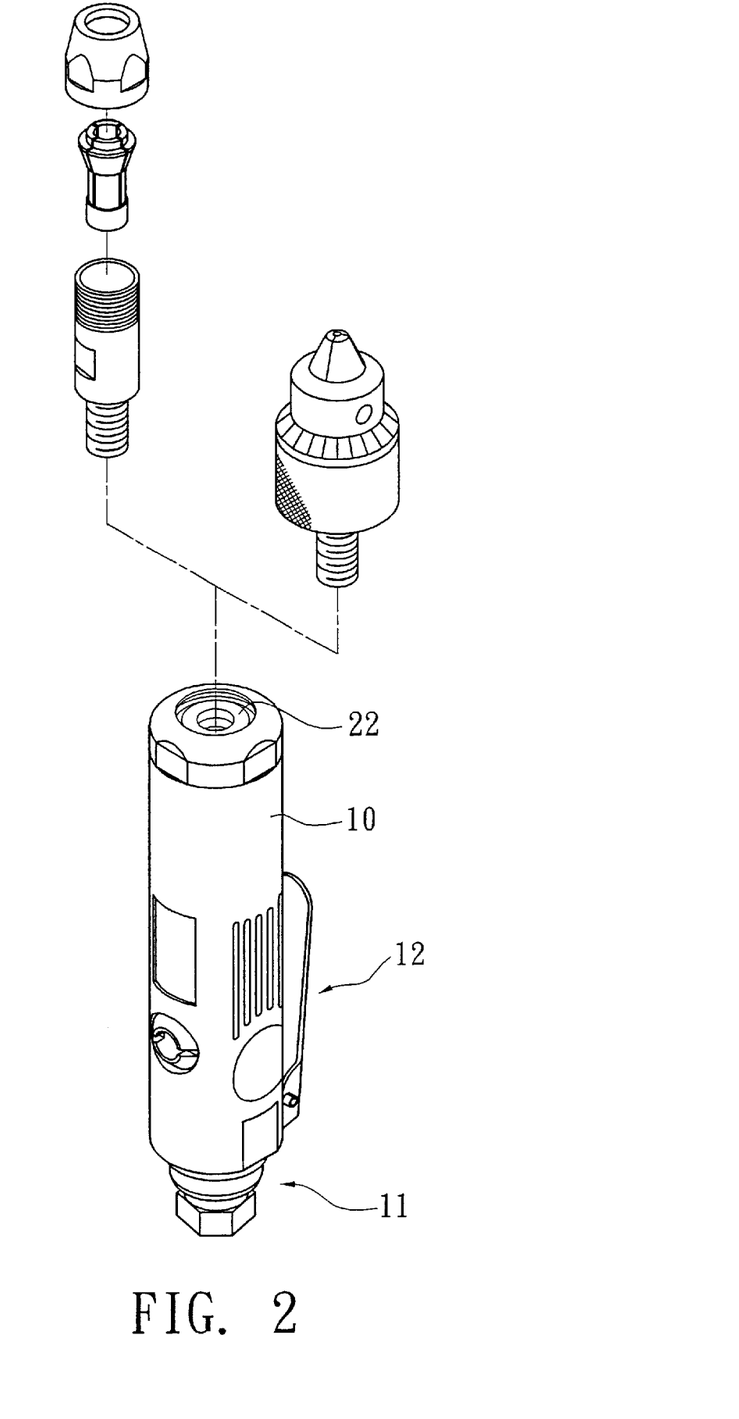
FIG. 2 is a schematic perspective view of the hand-held pneumatic tool in FIG. 1.
Figure 3:
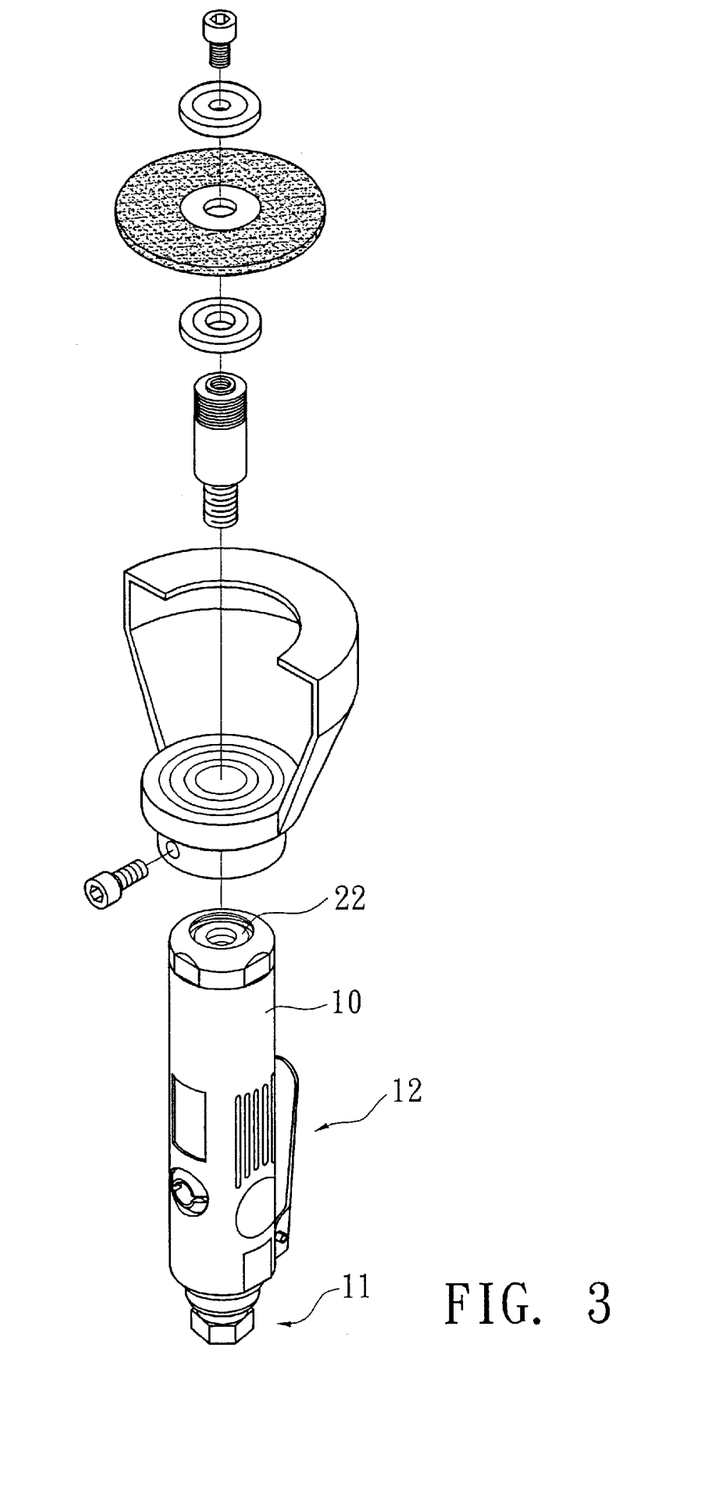
FIG. 3 is another schematic perspective view of the hand-held pneumatic too.
Figure 4:
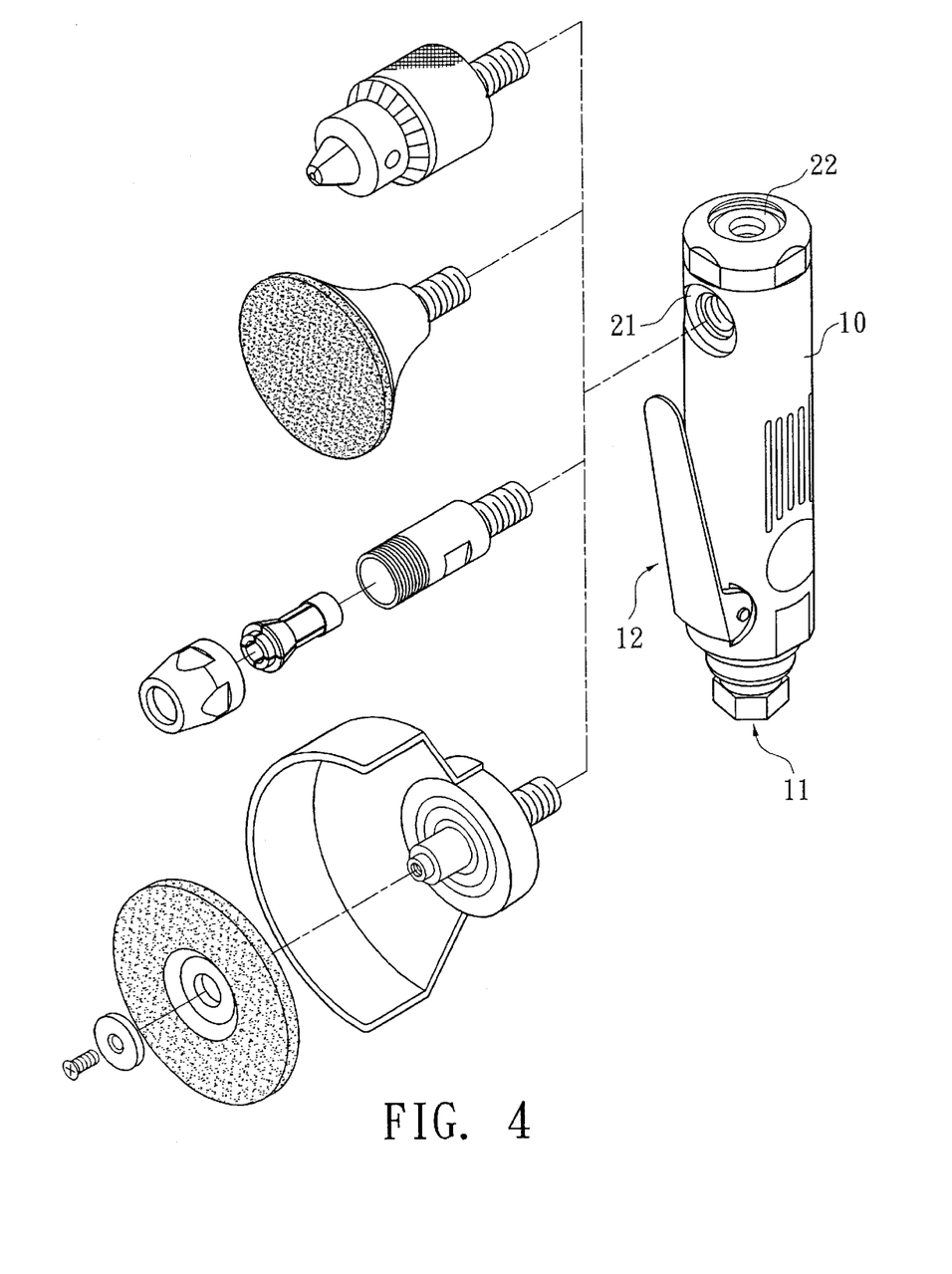
FIG. 4 is another schematic perspective view of the hand-held pneumatic tool in FIG. 1.

The output device (20) included a first output axle (21) and a second output axle (22). With reference to FIGS. 2 to 4, the first output axle (21) and the second output axle (22) are adapted to be connected to a corresponding one of multiple grinding device or tool holder for user to use the present invention to easily finish his/her job. The connecting structures between the first output axle (21) and the coupling (132) are bevel gears. The coupling (132) has a first bevel gear (134) formed on a distal periphery thereof and the first output axle (21) has a second bevel gear (212) formed to engage to the first bevel gear (134). The coupling (132)

rotatably drives the first output axle (21) when the first bevel gear (134) and the second bevel gear (212) are engaged to each other. The first output axle (21) and the shaft (131) each has an axis that forms an angle. In the preferred embodiment of the present invention, the angle between the first output axle (21) and the shaft (131) is 90 degrees, that is, the axis of the first output axle (21) and the axis of the shaft (131) perpendicularly correspond to each other. The first output axle (21) includes a threaded hole (211) centrally and longitudinally defined therein and adapted to be connected to tools for grinding, drilling or cutting.

The second output axle (22) is longitudinally and securely mounted to the coupling (132) so that the coupling (132) directly drives the second output axle (22). The second output axle (22) includes a first end and a second end opposite to the first end of the second output axle (22). The first end of the second output axle (22) has a threaded outer periphery such that the first end of the second output axle (22) is securely screwed into the threaded hole (133) in the coupling (132). A threaded hole (221) is longitudinally and centrally defined in the second end of the second output axle (22) and is adapted to be connected to tools for grinding, drilling or cutting.

The tubular body (10) further comprises a first cover (101) and a second cover (102) respectively attached to an outer periphery of the tubular body (10) and co-axially corresponding to the first output axle (21) and the second output axle (22). The first cover (101) and the second cover (102) provide effects of dust-proof and safety.

As described above, the user can choose a suitable output axle from the first output axle (21) and the second output axle (22) of the present invention due to the working type for a good working effect. Consequently, the user only needs to prepare one hand-held pneumatic tool that has two output axles. The present invention is invented which is substantially the combination of the above conventional hand-held pneumatic tool for reducing the cost of purchase of hand tool.

Although the invention has been explained in relation to its preferred embodiment, it is to be understood that many other possible modifications and variations can be made without departing from the spirit and scope of the invention as hereinafter claimed.

What is claimed is:

1. A hand-held pneumatic tool with two output axles, comprising:

a tubular body having a first end and a second end, the first end and the second end of the tubular bode co-axially corresponding to each other;

an inlet device and a switch device respectively mounted in the first end of the tubular body, the inlet device adapted to be connected to a high-pressure air source and the switch device controlling the inlet device;

a pneumatic motor mounted in a middle portion of the tubular body between the first end and the second end of the tubular body, the pneumatic motor including a shaft extending from the pneumatic motor toward the second end of the tubular and a coupling mounted on a free end of the shaft, the coupling having a first bevel gear formed on a distal periphery thereof; and an output device mounted in the second end of the tubular body and driven by the pneumatic motor, the output device including:

a first output axle adapted to be connected to a corresponding one of tools and having a second bevel gear formed to engage to the first bevel gear of the coupling, thereby the coupling rotatably drives the first output axle when the second bevel gear of the first output axle is engaged to the first bevel gear of the coupling, the first output axle and the shaft each having an axis and forms an angle that is 90 degrees; and a second output axle longitudinally and securely mounted to the coupling so that the coupling directly drives the second output axle, the second output axle adapted to be connected to a corresponding one of tools.

2. The hand-held pneumatic tool as claimed in claim 1, wherein the free end of the shaft is threaded and the coupling has a threaded hole centrally and longitudinally defined in the coupling so that the coupling is capable of being screwed onto the free end of the shaft.

3. The hand-held pneumatic tool as claimed in claim 2, wherein the first output axle has a threaded longitudinally and centrally defined and adapted for connecting with a corresponding one of tools.

4. The hand-held pneumatic tool as claimed in claim 3, wherein the second output axle has a threaded hole defined in a first end of the second output axle opposite to the coupling, the threaded hole in the second output axle adapted for connecting with a corresponding one of tools.

5. The hand-held pneumatic tool as claimed in claim 4, wherein the second output axle has a second end opposite to the first end of the second output axle, the second end of the second output axle having a threaded outer periphery such that the second end of the second output axle is screwed into the threaded hole in the coupling.

6. The hand-held pneumatic tool as claimed in claim 2, wherein the second output axle has a threaded hole defined in one end of the second output axle opposite to the coupling, the threaded hole in the second output axle adapted for connecting with a corresponding one of tools.

7. The hand-held pneumatic tool as claimed in claim 6, wherein the second output axle has a second end opposite to the first end of the second output axle, the second end of the second output axle having a threaded outer periphery such that the second end of the second output axle is screwed into the threaded hole in the coupling.

8. The hand-held pneumatic tool as claimed in claim 1, wherein the first output axle has a threaded longitudinally and centrally defined and adapted for connecting with a corresponding one of tools.

9. The hand-held pneumatic tool as claimed in claim 1, wherein the second output axle has a threaded hole defined in one end of the second output axle opposite to the coupling, the threaded hole in the second output axle adapted for connecting with a corresponding one of tools.

* * * * *